No. 650,795. Patented May 29, 1900.
W. T. MAXWELL & G. J. SPAHN.
BORING IMPLEMENT.
(Application filed Jan. 17, 1900.)
(No Model.) 3 Sheets—Sheet 1.
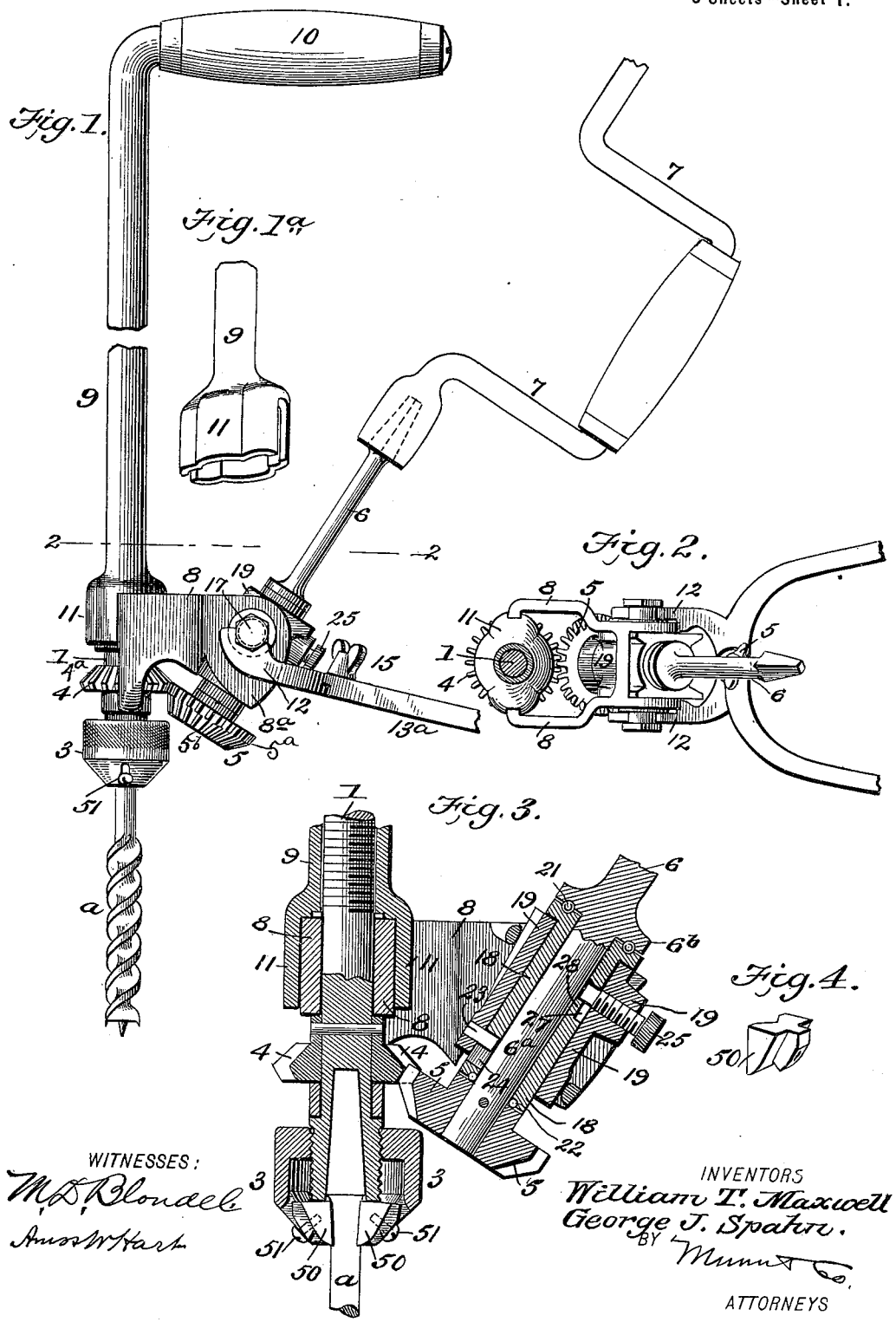
WITNESSES:
INVENTORS
William T. Maxwell
George J. Spahn.
BY
ATTORNEYS No. 650,795. Patented May 29, 1900.
W. T. MAXWELL & G. J. SPAHN.
BORING IMPLEMENT.
(Application filed Jan. 17, 1900.)
(No Model.) 3 Sheets—Sheet 2.
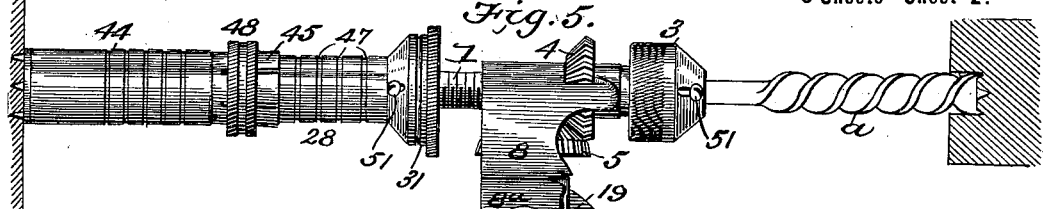
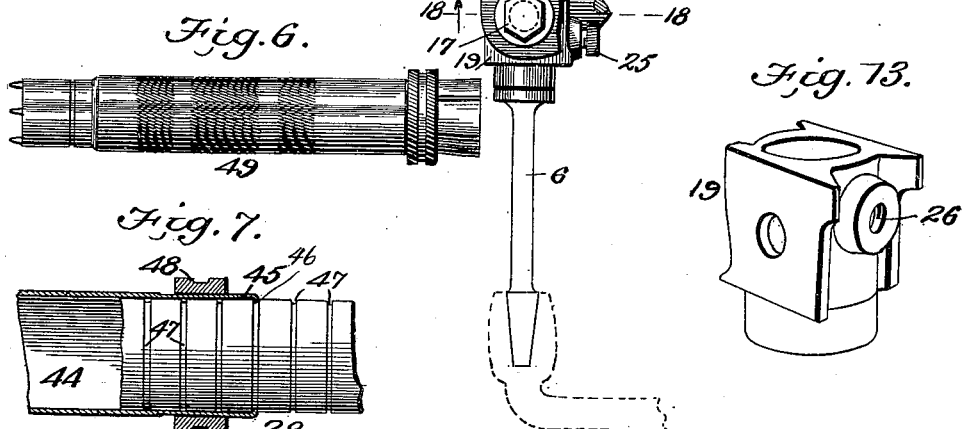
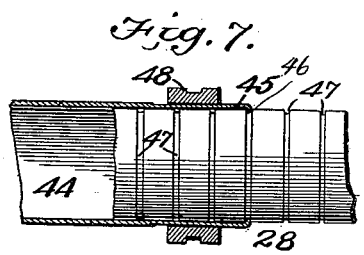
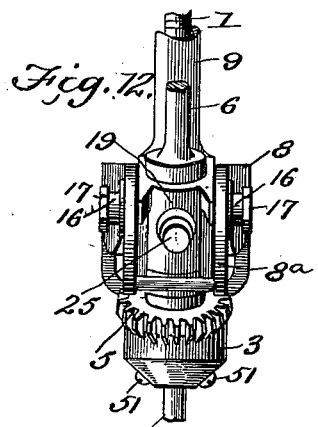
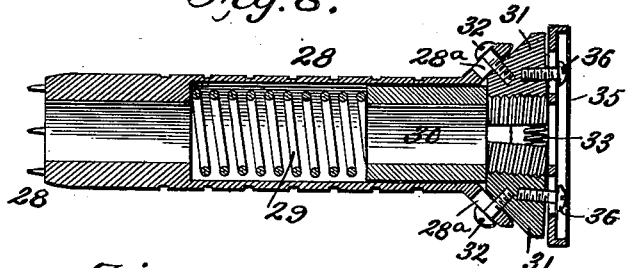
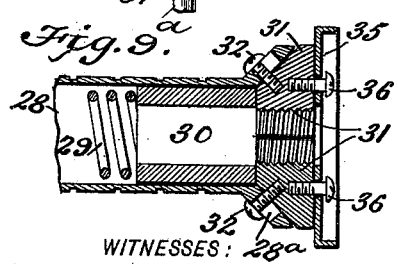
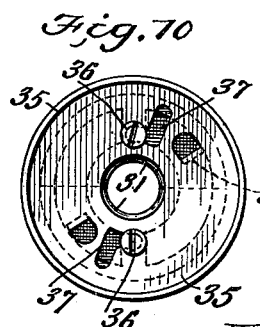
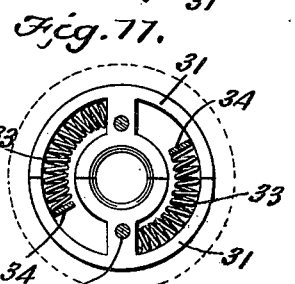
WITNESSES:
INVENTORS
William T. Maxwell.
George J. Spahn.
BY
ATTORNEYS No. 650,795. Patented May 29, 1900.
W. T. MAXWELL & G. J. SPAHN.
BORING IMPLEMENT.
(Application filed Jan. 17, 1900.)
(No Model.) 3 Sheets—Sheet 3.
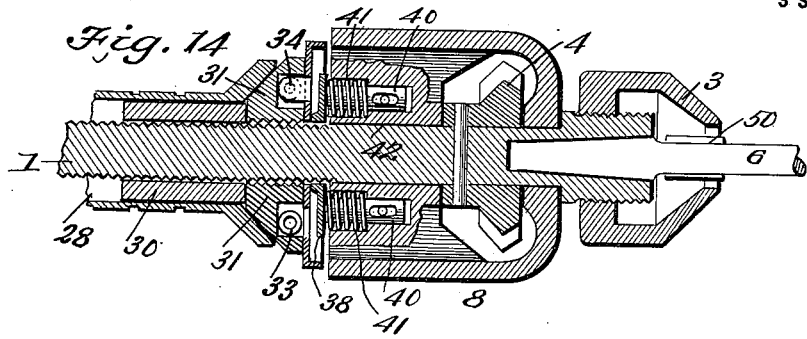
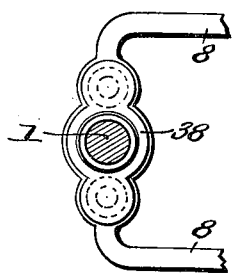
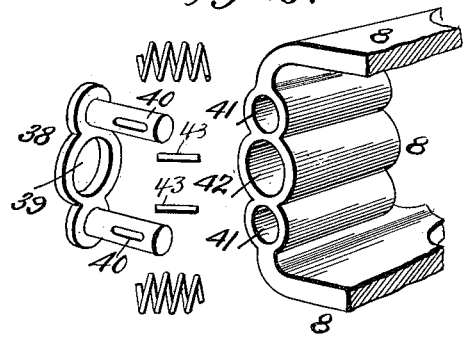
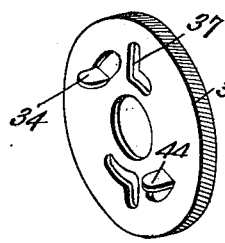
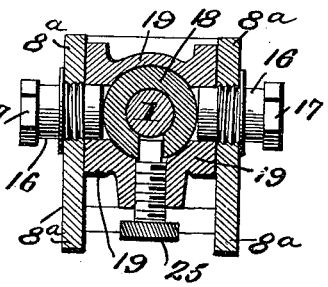
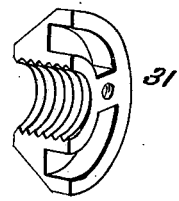
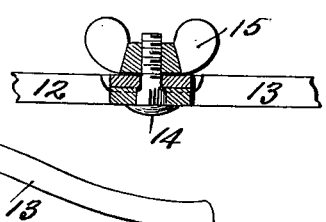
WITNESSES:
M. S. Blondel
Amos W. Hart
INVENTORS
William T. Maxwell.
George J. Spahn.
BY
Munn & Co.
ATTORNEYS
THE NORRIS PETERS CO., PHOTO-LITHO., WASHINGTON, D. C.

UNITED STATES PATENT OFFICE.

WILLIAM T. MAXWELL AND GEORGE J. SPAHN, OF BALTIMORE, MARYLAND.

BORING IMPLEMENT.

SPECIFICATION forming part of Letters Patent No. 650,795, dated May 29, 1900.

Application filed January 17, 1900. Serial No. 1,813. (No model.)

*To all whom it may concern:*

Be it known that we, WILLIAM T. MAXWELL and GEORGE J. SPAHN, of Baltimore, in the State of Maryland, have invented an Improved Boring Implement, of which the following is a specification.

Our invention is an improved implement for use in boring through joists or in corners or angles where the ordinary brace and bit cannot be used.

The invention is an improvement upon and embodies some of the parts of a boring implement for which we filed an application for patent on July 8, 1899, Serial No. 723,185, and which was allowed September 27, 1899.

The invention embodies many novel features of construction, arrangement, and operation of parts, as hereinafter described, reference being had to the accompanying drawings, in which—

Figure 1 is a side view of our improved implement in the form adapted for boring vertically in corners or angles. Fig. 1ª is a perspective detail view. Fig. 2 is a horizontal section on the line 2 2, Fig. 1, the rotatable brace being detached. Fig. 3 is an enlarged vertical central section of the main portion of the implement. Fig. 4 is a perspective view of one of the clamping-jaws of the clutch which secures the boring bit or auger in its socket. Fig. 5 is a side view of that form of the implement which is particularly adapted for boring joists. Fig. 6 is a side view of a tubular detachable extension of the back bearing for said implement. Fig. 7 is a detail section showing such extension as applied in use. Fig. 8 is a longitudinal section of the back bearing for the implement. Fig. 9 is a longitudinal section of a portion of the back bearing, showing a different position of the halves or parts of the nut which engage the threaded boring-shaft of the implement. Figs. 10 and 11 are face views of the adjusting-plate and the nut for the back bearing, respectively. Fig. 12 is a face view of the main portion of the implement, showing the construction of a portion of the frame thereof. Fig. 13 is a perspective view of the oscillating bearing-block for the rotatable shaft to which the brace is applied. Fig. 14 is an enlarged central longitudinal section of the main portion of the boring-machine, showing the back bearing adjusted in contact with parts attached to the frame. Fig. 15 is a plan view of a portion of the frame, the boring-shaft being in section. Fig. 16 includes perspective views of a portion of the frame and parts attached thereto to provide an elastic contact for the back bearing. Fig. 17 is a perspective view showing the under portion or surface of the disk or plate by which the halves of the nut which engage the boring-shaft are adjusted in open or closed position. Fig. 18 is a cross-section on the line 18 18 of Fig. 5. Fig. 19 is a perspective view of one of the halves of the nut which engages the threaded boring-shaft. Fig. 20 is a perspective view of a supplemental device for use in steadying and holding the boring implement when used in an angle or corner. Fig. 21 is a detail section of the joint of such device.

Referring in the first instance to Figs. 1, 2, and 3, $a$ indicates a boring-bit or auger proper, and 1 a threaded rotatable shaft, in whose end socket said bit is held detachably by means of a clutch 3, hereinafter described. A double-faced miter-gear 4 is secured to said shaft 1 and meshes with another double-faced miter-gear 5, that is keyed on a rotatable shaft 6. The latter has a tapered squared head adapted for application of an ordinary brace 7, as shown in Figs. 1 and 5. The working position of said shaft 6 is adapted to be shifted, so that it may be at an angle of about thirty-five degrees, Fig. 1, or at a right angle, Fig. 5, as the case may be, to the driven shaft 1 and bit $a$. These two positions or angles adapt the implement to be used with the bit $a$ vertical—say in a corner or like angle of a frame or room—as shown in Fig. 1, and also horizontally between joists, as in Fig. 5.

The threaded shaft 1 is guided and works in a smooth bore 42 in the skeleton frame 8. When the implement is worked in vertical position, Fig. 1, we employ a device for holding, supporting, and guiding it as well as pressing it downward with due force. The same consists of a tube 9 or a rod having a lengthwise socket in its lower end to receive the threaded portion of said shaft 1, projecting above the frame 8. The upper end of this holder and guide 9 has a handle 10, that projects at a right angle, while the lower end of the same is provided with notches forming fingers 11, (see Fig. 1ᵃ,) that are adapted to fit over and engage the frame 8 on each side of the shaft 1, as shown in Fig. 3. The object of this construction is to enable the operator to hold the frame 8 vertical and prevent rotation or lateral motion of the same while the implement is being worked. As a further or supplemental means for this purpose we propose to employ the bifurcated device shown partly in Figs. 1 and 2 and fully, but detached, in Fig. 20. This device is designed for contact with the leg of the operator. It consists of two parallel arms 12, which are constructed integrally with a third arm 13, extending in the opposite direction, but arranged in the same plane. A second arm 13ᵃ, corresponding to arm 13 in form, is arranged opposite the latter and detachably connected with it and the arms 12 at their juncture by means of a pivot-screw bolt 14, having a thumb-nut 15, whereby the parts may be clamped together. The meeting surfaces of said parts are serrated, as indicated in Fig. 20, to prevent them sliding on each other when the arm 13ᵃ is adjusted or set in any required position relative to the fixed arm 13. The arms 12 are spaced apart, so as to embrace the sides of frame 8 (see Fig. 2) and provided at their free ends with semicircular notches 12ᵃ (which are practically hooks) to adapt them for engagement with the peripheral grooves 16 of pins or bolts 17, Figs. 1, 2, and 18, that serve as trunnions or pivots for the shiftable box or bearing 19 in which the brace-shaft 6 is mounted. Such grooves 16 are formed by and between parallel flanges of the pivot-pins, and the inner flanges abut the sides of frame 8. The arms 12 have interior shoulders 12ᵇ, Fig. 20, which are arranged for frictional engagement with the eccentric end portions or cheeks 8ᵃ of the frame 8, as shown in Figs. 1 and 2—that is to say, to apply the supplemental device for holding and steadying the boring implement proper the hooks 12ᵃ of arms 12 are placed under the pivot-pins 17, and the shoulders 12ᵇ are then forced down on the eccentrics 8ᵃ, so as to lock therewith by friction. It is apparent such engagement may be easily and quickly released by upward pressure on the bifurcated device or implement-holder. The outer arms 13 and 13ᵃ of the latter are designed to embrace the knee or the adjacent portion of the leg of the operator as he kneels on the floor in front of the implement when using it. It is apparent the pivoted arm 13ᵃ allows the space between it and the fixed arm 13 to be widened or narrowed, as conditions may require.

The bearings for the brace-shaft 6 are constructed as follows: Referring particularly to Fig. 3, it will be seen that the elongated journal 6ᵃ of said shaft fits in a thick sleeve or bushing 18, which fitted loosely in the oscillatory bearing-block 19. The opposite sides of the latter are provided with shallow diametrical sockets to receive the smooth cylindrical inner ends of the pivot-pins 17. (Shown best in Fig. 18.) The sleeve 18 has a lateral flange at the end adjacent to the collar 6ᵇ on shaft 6, and small balls 21, Fig. 3, are interposed between them to mainly relieve the friction due to pressure. Similar balls 22 are arranged at the other end of the sleeve 18, between it and the gear 5. The said sleeve is adapted to slide lengthwise in the block 19, such movement being limited by the stop-pin 23, that fits in a longitudinal slot 24. This movement of the sleeve 18 is required in order to allow the shaft 6 to be shifted from the angle (thirty-five degrees) shown in Figs. 1, 2, and 3, to that (ninety degrees) shown in Fig. 5, since otherwise the gears 4 and 5 could not be alternately engaged and reëngaged as required. The clamp-screw 25, Fig. 3, having an enlarged milled head, passes through a hole 26, Fig. 13, in the oscillatory block 19, and its inner end enters a slot 27 in the sleeve 18, Fig. 3, and also a hole at the lower or inner end of such slot, when the gears 4 5 are placed at an oblique angle. By reversing the screw 25 its inner end will free the slot, and then the sleeve 18 may be slid outward to bring the gear 5 out of engagement with gear 4, when the bearing-block 19 is free to rotate on its pivots 17 far enough to bring it to a right angle with the boring-shaft 1, as shown in Fig. 5, which being done the shaft 6 and its sleeve 18 are pushed inward to carry the gear 5 again into mesh with gear 4. To hold the parts in this position, the screw 25 is screwed in again, so that its point bears on the shoulder 28 in the slot 27. The miter-gear 4, attached to the bit-shaft, has an obtuse-angle edge, and the two bevels thus formed are provided with teeth of different pitch, because formed on different pitch diameters or circles. In other words, the teeth 4ᵃ on the upper side of gear 4 are formed on a pitch-circle of less diameter than the lower or shorter teeth. The other gear 5 is adapted to mesh with said gear 4 when the brace-shaft 6 is placed at an angle of forty-five degrees to the bit-shaft, as shown in Fig. 1, or at ninety degrees thereto, as shown in Fig 5. To provide for such engagement, one of the bevel-faces—to wit, 5ᵇ of gear 5—is provided with teeth having the same pitch and inclination as the longer teeth of gear 4. The other or shorter bevel 5ᵃ of the gear 5 has but slight inclination, and therefore a very obtuse angle to the inner bevel 5ᵇ, and its teeth have a different pitch, because formed on a greater pitch-diameter. Their pitch and inclination correspond to the shorter teeth of gear 4, with which they mesh, as in Fig. 1. Thus, unlike gear 4, the two sets of teeth on gear 5 are not merely of different pitch and inclined at different angles, but inclined in the same general direction, or, to put it in other terms, in gear 5 the two bevels face in the same general direction, while in gear 4 they face in opposite directions.

When the implement is used between joists, as shown in Fig. 5, we employ a back-bearing 28, (see Figs. 5 and 8,) whose main features are substantially such as shown and described in my application, Serial No. 723,185, before referred to. It consists of a sleeve or cylinder containing a spiral spring 29 and a slidable tube 30, which is interposed between the spring and the two halves 31 of a nut, which are loosely attached by screws 32 to the flared end of the cylinder 28. The said screws pass through and are adapted to slide in slots 28ª, as shown. These half-nuts 31 are held apart by spiral springs 33, Fig. 11, which are arranged concentrically, as shown in Fig. 11. One end of each spring 33 is attached to and bears against one half-nut 31, and the other abuts a lip or flange 34, that projects inward from the rotatable locking plate or disk 35. The two flanges 34 may be formed by striking them out of the body of the disk 35 by means of dies. The latter is loosely attached to the half-nuts 31 by screws 36, that work in right-angular slots 37. When the disk or plate 35 is rotatively adjusted, as shown in Fig. 8, the screws 36 are in the outer ends of slots 37, and the half-nuts 31 are pressed apart by the spiral springs 33 and stand at a slight angle to each other, being consequently free from the screw-shaft 1. This position will, obviously, allow the backstay 28 to be slid freely on the shaft 1, so that it may be quickly adjusted toward or from the frame 3, as conditions require. When pressure is applied against the face of disk 35, it is apparent that half-nuts 31 will be forced back into the flared end of cylinder 28 and brought together, as in Fig. 9, so that their coincident threads engage those of shaft 1. Then the disk 35 is rotated to bring the screws 36 into the inner ends of the slots 37, whereby the half-nuts 31 are locked in the closed position and will remain so until said disk is rotated in the opposite direction, when, the screws being free to slide outward in the slots 37, the pressure of the springs 33 will again force the nuts 31 apart.

If the disk 35 were allowed to come in contact with the frames 8 when the backstay 28 is slid up on the shaft 1, it would frequently happen that the parts 31 of the nut would not catch or engage the thread of the shaft properly, and the heads of screws 36 would also come in contact with the frame. To avoid these results, we provide a spring-pusher, which is so applied to the frame as to exert back pressure on the disk 35 when slid up, as in Fig. 14. It consists (see also Figs. 15 and 16) of a plate 38, having a central opening 39 for the shaft 1 and parallel pins or studs 40 on its inner or under side. These pins 40 enter sockets 41 in the edge of frame 8, which are located on opposite sides of the hole 42, through which the shaft 1 passes. Cross-pins 43 or other means may be used to secure the pusher from detachment. Spiral springs surround the pins 40 in the sockets 41 and tend to press them outward, or, in other words, to press the plate 38 outward. When the backstay 28 is slid up and the disk 35 contacts with the pusher 38, the latter resists, and thus the half-nuts 31 are forced inward and caused to properly engage the threads of shaft 1. The central thickened portion of the pusher 38, which constitutes an annular rib on the same, rides or slides on the disk 35 if the latter be rotated to lock or unlock the screws 33 and half-nuts 31.

We show in Figs. 5 and 7 an extension-backstay 44 applied to 28. Its front end is provided with lengthwise slits, forming thus spring-fingers 45, which have slight inturned flanges 46 at their outer ends. When the extension 44 is slid onto 28, the elasticity of the fingers 45 permits them to pass over the annular ribs on the latter, and their flanges 46 enter the grooves 47 intervening the ribs, and thus engage the latter, as shown in Fig. 7. Then a compressing-ring 48 is slid up on the fingers 45 and locks them by friction, so that the two backstays 28 and 44 are rigidly connected.

If the space between joists requires it, we employ a backstay 49, which is longer than 44 and which may be applied to 28. In case all three backstays are used the backstay 49 is first applied to 28, and then 44 is applied to 49.

The construction and attachment of the bit-clutch are as follows: The cylindrical body 3 of the clutch (see Fig. 3) has a threaded opening or hole adapted to receive the enlarged threaded socket end of the rotatable shaft 1. The outer or lower end of the part 3 is made conical and provided with lengthwise slots. Jaws 50 are adapted to slide within such conical portion and to engage the shank of the bit just below its square portion. Screws 51 constitute a means of loose attachment for the jaws 50 and are adapted to slide in the slots of part 3. When the body 3 is screwed upon the threaded socket 1ª, the jaws 50 come in contact with the outer end of said socket and are thereby forced downward and inward, so as to embrace and support the bit.

What we claim is—

1. In a boring implement, the combination with the frame and a rotatable bit-carrying shaft, of a rotatable and longitudinally-slidable brace-shaft, and two meshing miter-gears applied to and connecting said shafts, one of said gears having teeth arranged in opposite directions, and the other having two sets of teeth inclined in the same direction, but at a less angle, a bearing for such brace-shaft which is pivoted and adapted to swing in the frame, and means for clamping said shaft in either of the two angles to which it may be adjusted, substantially as shown and described.

2. In a boring implement, the combination with the frame and bit-carrying shaft, of a brace or driving shaft, a sleeve in which said shaft is adapted to rotate, a bearing-block in which the sleeve slides and which is hung on fixed pivots in the frame, means for clamping the said sleeve and holding it in either of the two positions to which the driving-shaft may be adjusted, and two double-face miter-gears adapted to engage in such positions, substantially as shown and described.

3. In a boring implement, the combination with the frame and bit-carrying shaft, of a brace or driving shaft, a sleeve in which said shaft is adapted to rotate, a bearing-block in which the sleeve slides, and which is pivoted in the frame, and means for clamping the said sleeve and holding it in either of the two positions to which the driving-shaft may be adjusted, substantially as shown and described.

4. In a boring implement, the combination with the frame and bit-carrying shaft, of a driving-shaft and miter-gears connecting the same, a longitudinally-slidable sleeve in which the driving-shaft has its bearing, the same having a lengthwise slot provided with a shoulder, bearing-block hung on fixed pivots, and wherein said sleeve is adapted to slide, and a clamp-screw passing through said bearing and adapted to enter the slot in the sleeve and to serve as a clamp and stop therefor, substantially as shown and described.

5. In a boring implement, the combination with a bit-shaft having a miter-gear provided with two sets of teeth inclined in opposite directions to the axis, of a brace-shaft pivoted and adapted to be set at different angles to the bit-shaft, and a miter-gear keyed on such brace-shaft and having two sets of teeth of different pitch inclined in the same general direction, but at different angles to such axis, substantially as shown and described.

6. In a boring implement, the combination with a frame, a bit-carrying shaft, a brace-shaft adapted to be shifted from one angle to another, miter-gears applied to the respective shafts, one of said gears having bevels facing in opposite directions its teeth being continuous on the two bevels, and the other gear having bevels facing in the same general direction, there being a greater number of teeth on one bevel than the other, substantially as shown and described.

7. In a boring implement, the combination with a suitable frame, a rotatable bit-carrying shaft and a driving-shaft 6, geared therewith and adapted to be operated at an angle thereto, of a detachable support and holder 9, which is adapted to be placed over the bit-carrying shaft and constructed at its lower end with opposite jaws which are adapted to embrace a portion of the frame so that said holder is held rigidly alined with the bit-shaft, substantially as shown and described.

8. In a boring implement, the combination with a frame and a boring and driving shaft arranged therein of a supplemental supporting device which is provided with arms 8 adapted for being detachably engaged with said frame and with other arms or branches 13 and 13ª which are curved and extended laterally opposite each other and thus adapted to receive, or embrace, the leg of the operator, said device extending laterally beneath the brace-shaft as shown and described.

9. In a boring implement the combination with the frame having eccentric end portions and bit carrying and driving shafts of a supplemental supporting device having arms adapted for detachable engagement with lateral projections of the frame, and with other parts adapted for sliding engagement with the eccentric end portions which are located adjacent to said projection whereby the said device may be held in due working position by friction, substantially as shown and described.

10. In a boring implement the combination with the frame and shafts arranged therein of the supplemental supporting device adapted for detachable engagement with said frame and having arms or branches adapted to engage the leg of the operator, one of said arms being adjustable toward or from the other, and means for securing the same in any adjustment, substantially as shown and described.

11. In a boring implement, the combination, with the frame and shafts arranged therein, of the supplemental supporting device adapted for detachable engagement with said frame and having arms or branches adapted to engage the leg of the operator, one of said arms being adjustable toward or from the other, and means for securing the same in any adjustment, substantially as shown and described.

12. In a boring implement the combination, with a frame and rotatable bit-carrying shaft screw-threaded as specified, of a backstay and a nut consisting of two parts, adapted when placed together, to embrace and work on the thread of the shaft, and springs attached to said parts and tending to force them asunder, substantially as shown and described.

13. In a boring implement, the combination, with the frame and a bit-carrying shaft having a screw-thread as specified, of a nut adapted to engage the same and formed in two parts, spiral springs attached to said parts and arranged in sockets therein, for the purpose of forcing them asunder, and a backstay or support having a flaring mouth adapted to engage the bevel side of the nut, substantially as shown and described.

14. In a boring implement, the combination with the frame and rotatable bit-carrying shaft having a screw-thread, of a backstay or support for the implement, a divided nut whose parts are adapted to engage the thread of said shaft and provided with sockets, spiral springs arranged in said sockets and tending to force the parts of the nut asunder, a plate or disk loosely secured to the parts of the nut by means of screws and provided with lips or flanges adapted to enter the sockets in the nut and to act against the springs for compressing them when rotated backward, substantially as shown and described.

15. In a boring implement, the combination, with the frame and rotatable bit-carrying shaft having a screw-thread, of a backstay or support for the implement, a divided nut whose parts are adapted to engage the thread of said shaft and provided with sockets in their faces, spiral springs arranged in said sockets and tending to force the parts of the nut asunder, a rotatable plate or disk loosely secured to the faces of the half-nuts and provided with right-angular slots, screws passing through said slots and entering the half-nuts, lips or flanges projecting from the under side of said disk and engaging the free ends of the spiral springs, the nuts being beveled and adapted to engage the flaring end of the backstay, substantially as shown and described.

16. In a boring implement, the combination, with the frame and a screw-threaded bit-carrying shaft, of a backstay, a divided nut applied thereto and a spring for separating them as specified, of a spring-pusher or pressing device applied to said frame and adapted to engage or press upon the nut, for the purpose of forcing its parts in the proper engagement with the threaded shaft, when the backstay is slid toward the frame, substantially as shown and described.

17. In a boring implement, the combination, with the frame having sockets as specified, and the bit-carrying shaft adapted to rotate in said frame and screw-threaded as specified, of a backstay and nut formed in two parts and adapted to work on the threaded shaft, a spring or springs tending to force the parts of the nuts asunder, a rotatable disk loosely engaged with said parts of the nut, and adapted to compress the spring when rotated, a spring-pusher consisting of a plate adapted to bear against said disk and having pins which enter the aforesaid sockets in the frame, and spiral springs encircling said pins in the sockets, substantially as shown and described.

18. In a boring implement, the combination, with a frame, a bit-carrying shaft, and a driving-shaft geared therewith, of a backstay adapted to be applied to the bit-carrying shaft and provided with a nut for working on the threaded portion of the same, and an extension-backstay having a tubular body, adapted to receive the first-named backstay, and provided with spring-fingers adapted to engage depressions or grooves in the first-named backstay, and means for clamping the fingers therein, substantially as shown and described.

WILLIAM T. MAXWELL.
GEORGE J. SPAHN.

Witnesses:
LOUIS J. G. STROTT,
JOSEPH RYSANCK.